US008721088B2

(12) United States Patent
Kang et al.

(10) Patent No.: US 8,721,088 B2
(45) Date of Patent: May 13, 2014

(54) LENS ARRAY MODULE AND PROJECTION APPARATUS

(75) Inventors: Yi-Hao Kang, Hsinchu (TW);
Jiunn-Lih Lin, Hsinchu (TW);
Chia-Chang Lee, Hsinchu (TW);
Chi-Tang Hsieh, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 154 days.

(21) Appl. No.: 13/118,452

(22) Filed: May 29, 2011

(65) Prior Publication Data
US 2012/0075593 A1    Mar. 29, 2012

(30) Foreign Application Priority Data

Sep. 24, 2010   (TW) ............................... 99132442 A

(51) Int. Cl.
*G02B 3/00* (2006.01)
*G03B 21/14* (2006.01)
*G02F 1/1335* (2006.01)

(52) U.S. Cl.
USPC .............. 353/38; 359/742; 362/309; 362/333

(58) Field of Classification Search
USPC ............. 353/38, 102; 359/742, 743; 362/309, 362/331, 332, 333
See application file for complete search history.

(56) References Cited

U.S. PATENT DOCUMENTS

| 5,098,184 | A | * | 3/1992 | van den Brandt et al. ..... 353/102 |
| 5,418,583 | A | | 5/1995 | Masumoto |
| 6,075,652 | A | * | 6/2000 | Ono et al. ...................... 359/642 |
| 6,462,794 | B1 | * | 10/2002 | Yoshikawa et al. ............. 349/95 |
| 6,860,607 | B2 | | 3/2005 | Yanagisawa |
| 7,736,029 | B2 | | 6/2010 | Chen et al. |

FOREIGN PATENT DOCUMENTS

TW    200928437    7/2009

OTHER PUBLICATIONS

"Office Action of Taiwan Counterpart Application", issued on Jul. 17, 2013, p1-p8, in which the listed foreign reference was cited.

* cited by examiner

*Primary Examiner* — William C Dowling
(74) *Attorney, Agent, or Firm* — Jianq Chyun IP Office

(57) ABSTRACT

A lens array module includes a light incident surface, a light emitting surface opposite to the light incident surface, and a plurality of first and second lens surfaces. The first lens surfaces are arranged on the light incident surface to form into an array. The second lens surfaces are arranged on the light emitting surface to form into an array. The center of curvature of each of the first lens surfaces located at two opposite sides of a first reference point on the light incident surface deviates away from the first reference point in a direction parallel to a first reference axis, and the center of curvature of each of the second lens surfaces located at two opposite sides of a second reference point on the light emitting surface deviates toward the second reference point in a direction parallel to the first reference axis. A projection apparatus is also provided.

17 Claims, 8 Drawing Sheets

LENS ARRAY MODULE AND PROJECTION APPARATUS

CROSS-REFERENCE TO RELATED APPLICATION

This application claims the priority benefit of Taiwan application serial no. 99132442, filed Sep. 24, 2010. The entirety of the above-mentioned patent application is hereby incorporated by reference herein and made a part of this specification.

BACKGROUND OF THE INVENTION

1. Field of the Invention

The invention generally relates to an optical module and a display apparatus, and more particularly to a lens array module and a projection apparatus.

2. Description of Related Art

The projection apparatus has not been replaceable in the display field due to the small footprint device being capable of generating a large image. Moreover, the size of the large image can be much larger than the size of a typical flat panel display. This type of large image is especially suitable for reports, conferences, or the playback of movies.

In order for the light emitted by the light source in the projection apparatus to be efficiently transmitted to the light valve, conventional projection apparatuses adopt two lens arrays. Moreover, each of the lenses in a first lens array directly faces a lens in a second lens array. However, for the part of the illumination beam emitted by the light source that is obliquely incident onto a lens of the first lens array at a large angle, typically this part of the beam cannot enter the corresponding lens of the second lens array. Rather, this part of the illumination beam enters another lens beside the corresponding lens, causing a stray light to be transmitted to two long sides at the top and bottom of the rectangular light valve, and thereby contributing to an energy loss in a phenomenon referred to as crosstalk. From another perspective, a part of the light emitted from a lens of the first lens array is transmitted to a region outside of the area encompassed by the corresponding lens in the second lens array. Therefore, a stray light is transmitted to two sides of the light valve and cannot be effectively transmitted to the light valve.

Hence, even though the two lens arrays in the conventional projection apparatuses are for enhancing light utilization efficiency, the degree of light utilization efficiency enhancement is still limited due to the aforementioned reasons.

U.S. Pat. No. 6,860,607 discloses a lens array, in which a small lens on one of two rows at the centermost area of a second lens array surface is the thickest. Moreover, U.S. Pat. No. 5,418,583 discloses a lens array, in which the size of a small lens on a second lens array surface is adjusted according to the size and shape of the light spot generated by a light beam emitted by a first lens surface.

SUMMARY OF THE INVENTION

Accordingly, the invention is disclosed a lens array module capable of having a high light utilization efficiency.

The invention is disclosed a projection apparatus capable of providing an image with a high brightness.

Other objects and advantages of the invention can be further illustrated by the technical features broadly embodied and described as follows.

In order to achieve one or a part of or all of the above advantages or other advantages, an embodiment of the invention provides a lens array module, including a light incident surface, a light emitting surface, a plurality of first lens surfaces, and a plurality of second lens surfaces. The light emitting surface is opposite to the light incident surface. The first lens surfaces are arranged on the light incident surface to form into an array. The second lens surfaces are arranged on the light emitting surface to form into an array. A center of curvature of each of the first lens surfaces located at two opposite sides of a first reference point on the light incident surface deviates away from the first reference point in a direction parallel to a first reference axis, and a center of curvature of each of the second lens surfaces located at two opposite sides of a second reference point on the light emitting surface deviates toward the second reference point in a direction parallel to the first reference axis.

An embodiment of the invention provides a lens array module, wherein the first reference point is disposed at a center of the light incident surface, and the second reference point is disposed at a center of the light emitting surface.

An embodiment of the invention provides a lens array module, wherein the first reference axis is substantially perpendicular to an optical axis of the lens array module.

An embodiment of the invention provides a lens array module, wherein the center of curvature of each of the first lens surfaces located at another two sides of the first reference point on the light incident surface deviates away from the first reference point in a direction parallel to a second reference axis, and the center of curvature of each of the second lens surfaces located at another two sides of the second reference point on the light emitting surface deviates toward the second reference point in a direction parallel to the second reference axis, wherein the first reference axis is not parallel to the second reference axis.

An embodiment of the invention provides a lens array module, wherein the first reference axis and the second reference axis are substantially perpendicular to the optical axis of the lens array module, and the first reference axis is substantially perpendicular to the second reference axis.

An embodiment of the invention provides a lens array module, wherein no segmented step exists between two adjacent first lens surfaces, and no segmented step exists between two adjacent second lens surfaces.

An embodiment of the invention provides a lens array module, wherein an area of each of the second lens surfaces adjacent to the second reference point in a direction parallel to the first reference axis is greater than an area of each of the second lens surfaces away from the second reference point in the direction parallel to the first reference axis.

An embodiment of the invention provides a lens array module, wherein the first reference point deviates from the center of the light incident surface, and the second reference point deviates from the center of the light emitting surface.

An embodiment of the invention provides a lens array module, wherein each of the first lens surfaces respectively corresponds to each of the second lens surfaces, and the illumination beam passing through a part of the first lens surfaces respectively passes through the corresponding a part of the second lens surfaces.

An embodiment of the invention provides a lens array module, wherein areas of at least a part of the second lens surfaces respectively cover the illumination beam from the corresponding a part of first lens surfaces.

An embodiment of the invention provides a lens array module, wherein the light source comprises at least a light-emitting diode.

Another embodiment of the invention provides a projection apparatus including a light source, a lens array module, and a light valve. The light source is capable of emitting an illumination beam. The lens array module is disposed on a transmission path of the illumination beam, and the illumination beam passes through the light incident surface and the light emitting surface in sequence. The light valve is disposed on the transmission path of the illumination beam from the lens array module, and the light valve is capable of converting the illumination beam into an image beam.

In view of the foregoing, the embodiments of the invention include at least one of the following advantages or effects. In the lens array module and the projection apparatus according to the embodiments of the invention, since the center of curvature of each of the first lens surfaces located at two opposite sides of the first reference point on the light incident surface deviates away from the first reference point in a direction parallel to the first reference axis, and the center of curvature of each of the second lens surfaces located at two opposite sides of the second reference point on the light emitting surface deviates toward the second reference point in a direction parallel to the first reference axis, therefore, when the light from the first lens surfaces is projected on the light emitting surface, the projection range exceeding the area of the corresponding second lens surfaces is effectively reduced. Accordingly, the crosstalk phenomenon is effectively reduced so as to enhance the light utilization efficiency, and thereby the brightness of the images provided by the projection apparatus is increased. Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
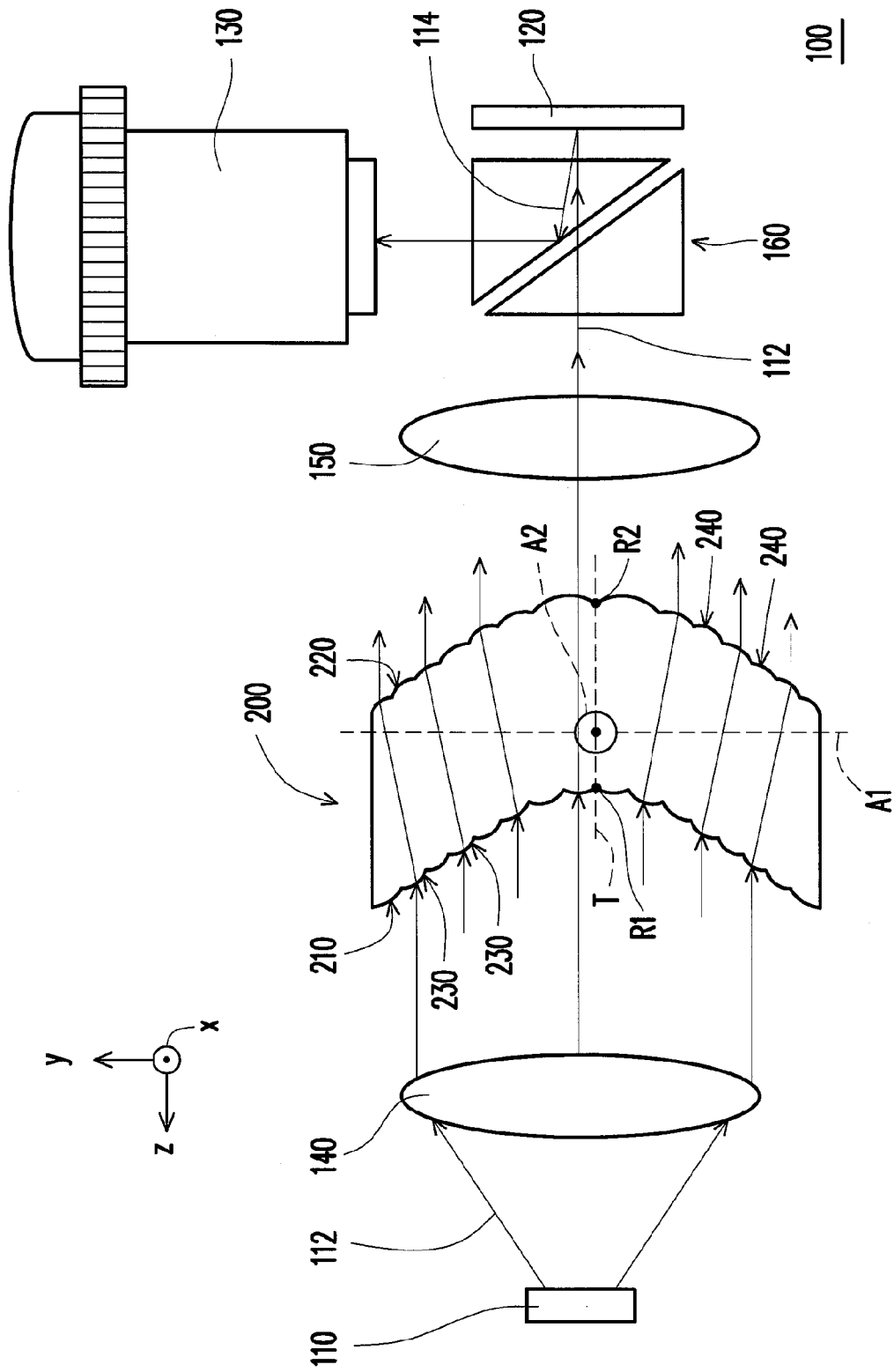
FIG. 1 is a schematic view of an optical path of a projection apparatus according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIGS. 1, 2A-2B, and 3A-3B, a projection apparatus 100 of the embodiment includes a light source 110, a lens array module 200, and a light valve 120. The light source 110 is capable of emitting an illuminating beam 112. In the embodiment, the light source 110 includes at least a light-emitting diode (LED). However, in other embodiments, the light source 110 may also be an ultra high pressure lamp (UHP lamp) or other suitable light emitting devices. The lens array module 200 is disposed on a transmission path of the illumination beam 112 so as to achieve an effect of reshaping and uniforming the illumination beam 112. The light valve 120 is disposed on the transmission path of the illumination beam 112 from the lens array module 200, and the light valve 120 is capable of converting the illumination beam 112 into an image beam 114. In the embodiment of the invention, the light valve 120 is, for example, a digital micro-mirror device (DMD). However, in other embodiments, the light valve 120 may also be a liquid-crystal-on-silicon panel (LCOS panel) or other suitable spatial light modulators.

In the embodiment of the invention, the projection apparatus 100 further includes a projection lens 130 disposed on the transmission path of the image beam 114 so as to project the image beam 114 onto a screen (not shown) to form images. Moreover, in other embodiments, the projection apparatus 100 includes a lens 140 disposed on the transmission path of the illumination beam 112 and between the light source 110 and the lens array module 200, so as to project the illumination beam 112 onto the lens array module 200. Furthermore, in this embodiments, the projection apparatus 100 further includes a lens 150 disposed on the transmission path of the illumination beam 112 and between the lens array module 200 and the light valve 120, so as to project the illumination beam 112 onto the light valve 120.

Moreover, in the embodiment of the invention, the projection apparatus 100 further includes a total internal reflection prism (TIR prism) 160 disposed on the transmission path of the illumination beam 112 between the lens array module 200 and the light valve 120, and the TIR prism 160 is disposed on the transmission path of the image beam 114 between the light valve 120 and the projection lens 130, so as to suitably adjust the optical path. However, in other embodiments, a field lens, a reflection mirror or another optical path adjusting element may be employed to replace the TIR prism 160.

Figure 3A:
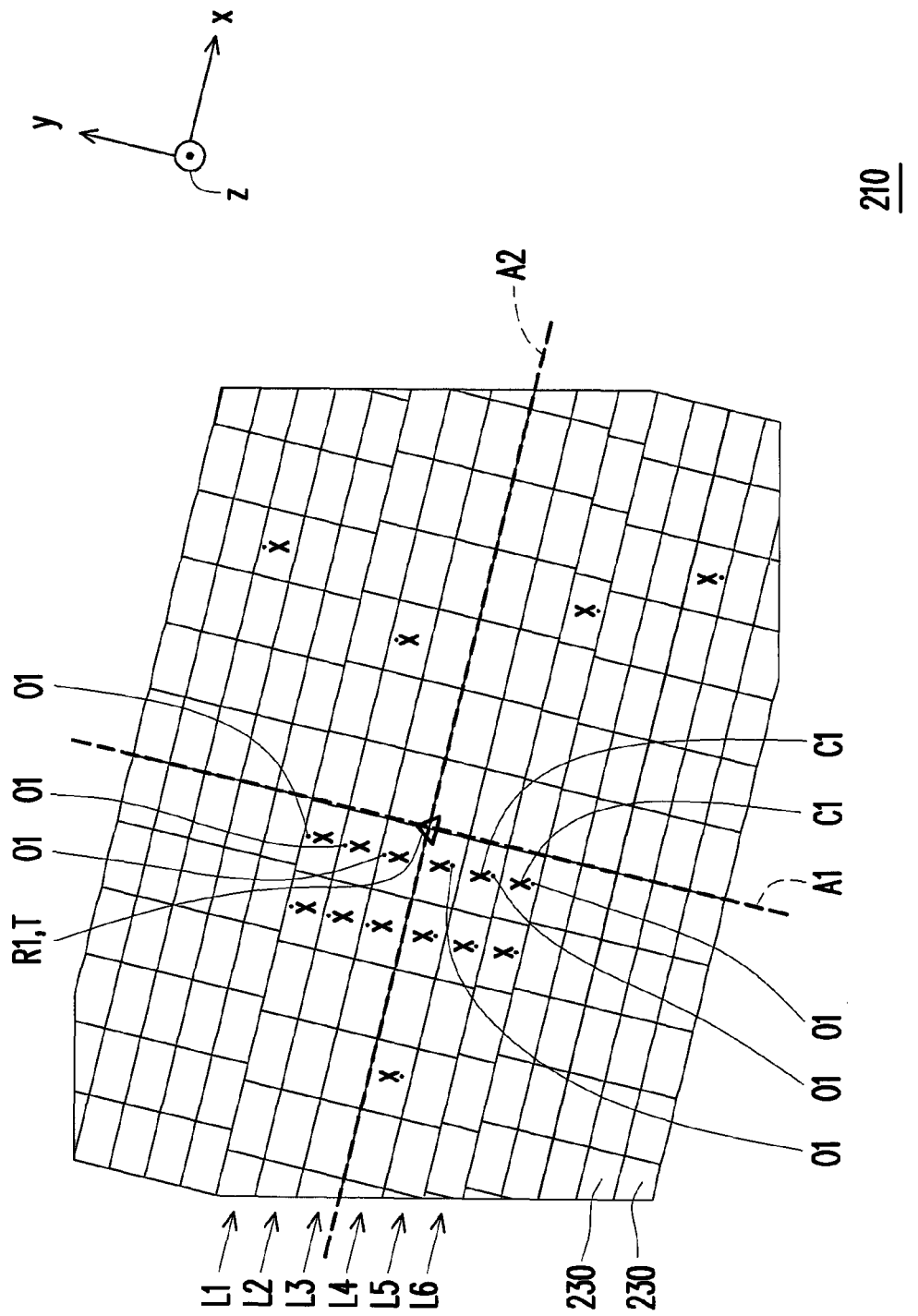
FIGS. 3A and 3B are respectively front views of a light incident surface and a light emitting surface of the lens array module depicted in FIG. 1.
Figure 3B:
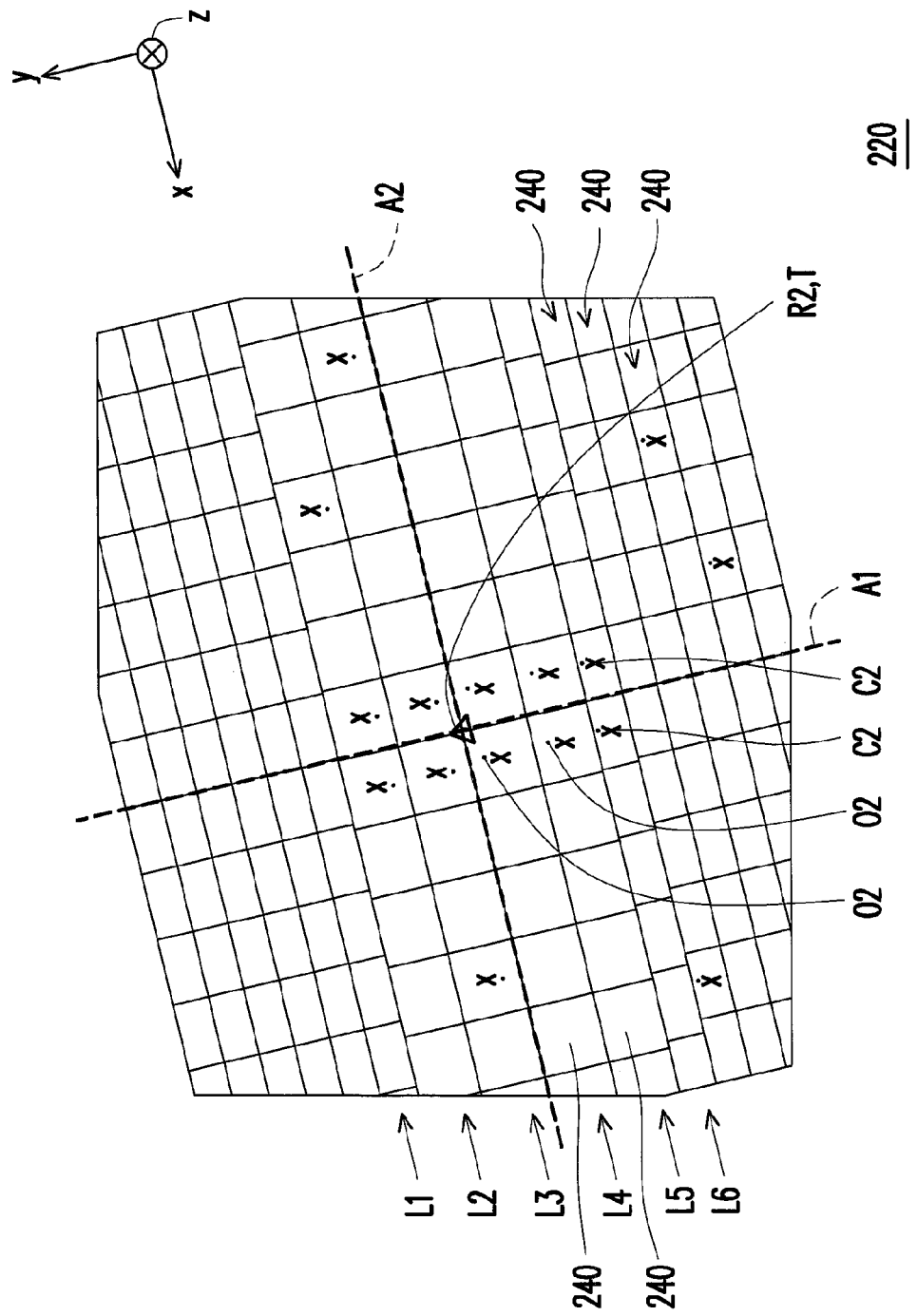

The lens array module 200 includes a light incident surface 210, a light emitting surface 220, a plurality of first lens surfaces 230, and a plurality of second lens surfaces 240. The light emitting surface 220 is opposite to the light incident surface 210, and the illumination beam 112 passes through the light incident surface 210 and the light emitting surface 220 in sequence. The first lens surfaces 230 are arranged on the light incident surface 210 to form into an array, and the second lens surfaces 240 are arranged on the light emitting surface 220 to form into an array. In the embodiment of the invention, each of the first lens surfaces 230 and the second lens surfaces 240 is a convex surface. A center of curvature O1 of each of the first lens surfaces 230 located at two opposite sides (e.g., two opposite sides of a second reference axis A2 depicted in FIG. 3A) of a first reference point R1 on the light incident surface 210 deviates away from the first reference point R1 in a direction parallel to a first reference axis A1 (e.g., by comparing the center of curvature O1 and the center C1 of the first lens surface 230, the center of curvature O1 is deviating in a direction away from the first reference point R1, as shown in FIG. 3A). Moreover, a center of curvature O2 of each of the second lens surfaces 240 located at two opposite sides (e.g., two opposite sides of a second reference axis A2 depicted in FIG. 3B) of a second reference point R2 on the light emitting surface 220 deviates toward the second reference point R2 in a direction parallel to the first reference axis A1 (e.g., by comparing the center of curvature O2 and the center C2 of the second lens surface 240, the center of curvature O2 is deviating in a direction toward the second reference point R1, as shown in FIG. 3B). In the embodiment, the lens array module 200 is formed by a single transparent substrate, although the invention is not limited thereto. In the embodiment, the radii of curvature of the first lens surfaces 230 may be completely the same, partially different, or completely different. A deviation of the centers of curvature O1 of the first lens surfaces 230 may be completely the same, partially different, or completely different. The radii of curvature of the second lens surfaces 240 may be completely the same, partially different, or completely different. Moreover, a deviation of the centers of curvature O2 of the second lens surfaces 240 may be completely the same, partially different, or completely different. Furthermore, in the embodiment, each of the first lens surfaces 230 and the second lens surfaces 240 is, for example, a spherical surface. However, in other embodiments, each of the first lens surfaces 230 and the second lens surfaces 240 may also be an aspherical surface or a free form surface.

In the embodiment, the first reference axis A1 is, for example, substantially parallel to the y-direction depicted in FIGS. 1 and 3A-3B. The second reference axis A2 is, for example, substantially parallel to the x-direction. An optical axis T of the lens array module 200 is, for example, substantially parallel to the z-direction. The x-direction, y-direction, and z-direction are, for example, perpendicular to each other so as to form a coordinate system. In other words, in the embodiment, the first reference axis A1 is substantially perpendicular to the optical axis T of the lens array module 200. Moreover, in the embodiment, the first reference point R1 is disposed at a center of the light incident surface 210, and the second reference point R2 is disposed at a center of the light emitting surface 220, although the invention is not limited thereto.

In the embodiment of the invention, the first lens surfaces 230 respectively corresponds to the second lens surfaces 240, and the illumination beam 112 passing through the first lens surfaces 230 respectively passes through the corresponding second lens surfaces 240.

Since the center of curvature O1 of each of the first lens surfaces 230 located at two opposite sides of the first reference point R1 on the light incident surface 210 deviates away from the first reference point R1 in a direction parallel to the first reference axis A1, and the center of curvature O2 of each of the second lens surfaces 240 located at two opposite sides of the second reference point R2 on the light emitting surface 220 deviates toward the second reference point R2 in a direction parallel to the first reference axis A1, therefore, when the light from the first lens surfaces 230 is projected on the light emitting surface 220, the projection range exceeding the area of the projected (i.e., the corresponding) second lens surfaces 240 is effectively reduced. Accordingly, a crosstalk phenomenon is effectively reduced and the generation of stray light is lowered, so as to enhance the light utilization efficiency, and thereby a brightness of the images provided by the projection apparatus 100 is increased.

In order to further reduce the crosstalk phenomenon and the generation of stray light, in the embodiment of the invention, areas of at least a part of the second lens surfaces respectively cover the illumination beam from the corresponding first lens surfaces 230.

In the embodiment, an area of each of the second lens surfaces 240 adjacent to the second reference point R2 in a direction parallel to the first reference axis A1 is greater than an area of each of the second lens surfaces 240 away from the second reference point R2 in the direction parallel to the first reference axis A1. In the embodiment, since energy of the illumination beam 112 near the center of the lens array 200 is more intense, incorporating such a design enhances light utilization efficiency and effectively reduces stray light.

Figure 2A:
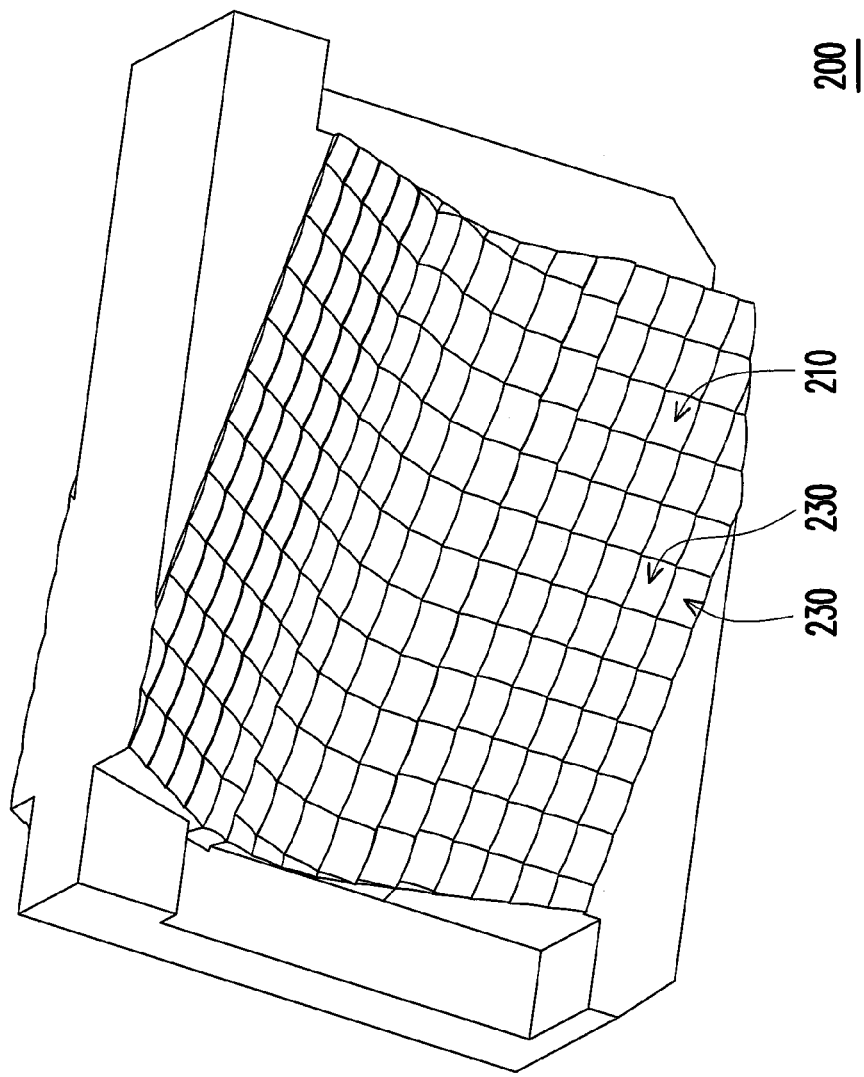
FIGS. 2A and 2B are respectively perspective views of a lens array module depicted in FIG. 1 at two different angles of view.
Figure 2B:
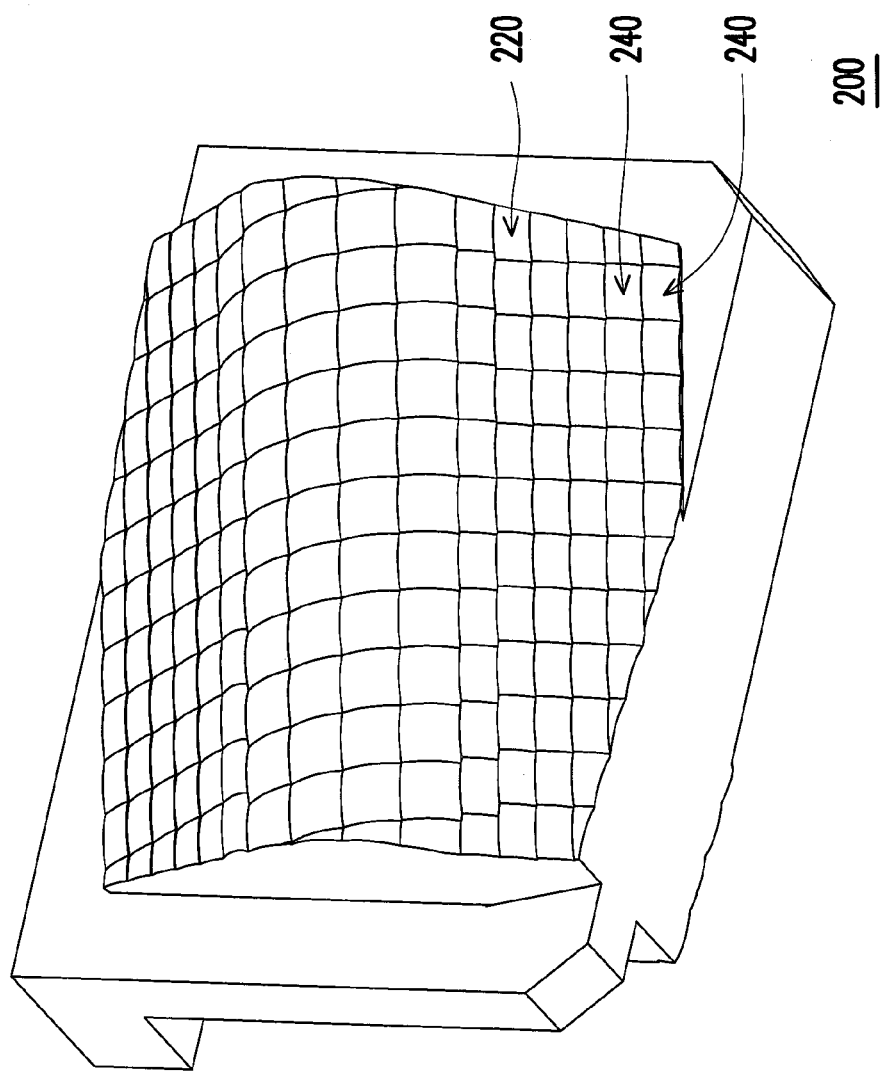

In the embodiment, no segmented step exists between two neighboring first lens surfaces 230, and no segmented step exists between two neighboring second lens surfaces 240. Moreover, since the center of curvature O1 of the first lens surfaces 230 and the center of curvature O2 of the second lens surfaces 240 deviate in the afore-described manner, the light incident surface 210 as a whole has a curved concave contour on the y-direction. In addition, the light emitting surface 220 as a whole has a curved convex contour on the y-direction, as shown in FIGS. 1 and 2A-2B. However, in other embodiments, the aforementioned segmented step may be non-existent or minimum in practice. Due to the lack of segmented steps, the generation of stray light may be effectively reduced, thereby enhancing light utilization efficiency.

Table 1 and 2 below respectively lists a plurality of parameters of the first lens surfaces 230 and the second lens surfaces 240 according to an embodiment of the invention. However, Table 1 and 2 forms an example for illustration, and as such the invention should not be construed as limited thereto.

TABLE 1

| Line Number | Width on x-direction | Width on y-direction | Radius of curvature of lens surface | Deviation of center of curvature of lens surface relative to center of lens surface |
|---|---|---|---|---|
| L1 | 0.56 | 0.30 | 0.70 | 0.35 |
| L2 | 0.57 | 0.32 | 0.70 | 0.30 |
| L3 | 0.57 | 0.33 | 0.70 | 0.10 |
| L4 | 0.57 | 0.33 | 0.70 | −0.10 |
| L5 | 0.57 | 0.32 | 0.70 | −0.30 |
| L6 | 0.56 | 0.30 | 0.70 | −0.35 |

TABLE 2

| Line Number | Width on x-direction | Width on y-direction | Radius of curvature of lens surface | Deviation of center of curvature of lens surface relative to center of lens surface |
|---|---|---|---|---|
| L1 | 0.56 | 0.30 | −0.93 | −0.43 |
| L2 | 0.57 | 0.49 | −0.84 | −0.30 |
| L3 | 0.57 | 0.53 | −0.70 | −0.10 |
| L4 | 0.57 | 0.53 | −0.70 | 0.10 |
| L5 | 0.57 | 0.49 | −0.84 | 0.30 |
| L6 | 0.56 | 0.30 | −0.93 | 0.43 |

The lens surface parameters listed in Tables 1 and 2 are respectively the parameters of the lines L1-L6 of the first lens surfaces 230 depicted in FIG. 3A, and the parameters of the lines L1-L6 of the second lens surfaces 240 depicted in FIG. 3B. For example, 0.56, 0.30, 0.70, and 0.35 of line L1 in Table 1 respectively represents that the lens surface at line L1 of the first lens surface 230 in FIG. 3A has a width of 0.56 mm on the x-direction, a width of 0.30 mm on the y-direction, a radius of curvature of 0.70 mm, and that a deviation of the center of curvature O1 of the lens surface at line L1 of the first lens surface 230 relative to the center C1 on the y-direction is 0.35 mm. The physical meanings of the other numerical values in Tables 1 and 2 can be similarly interpreted. Moreover, the units of the numerical values in Tables 1 and 2 are all millimeters.

In the embodiment of the invention, an active surface of the light valve 120 is substantially rectangular. The short side of the active surface parallel to the direction of the first reference axis A1, and the long side of the active surface parallel to the direction of the second reference axis A2. In the embodiment, the first reference axis A1 is parallel to the short side of the active surface, and the second reference axis A2 is parallel to the long side of the active surface. In the embodiment of the invention, a length-to-width ratio of the first lens surfaces 230 and the second lens surfaces 240 approaches a length-to-width ratio of the active surface, although the invention is not limited thereto. In the embodiment, edges of the first lens surfaces 230 are rotated by an angle on the x-y plane relative to an edge of the entire lens array module 200, as shown in FIG. 2A. Moreover, edges of the second lens surfaces 240 are rotated by an angle on the x-y plane relative to an edge of the entire lens array module 200, as shown in FIG. 2B. By incorporating such a design, a beam shape distortion generated when the illumination beam 112 is incident onto the active surface can be compensated. However, in other embodiments, the afore-described rotation angle may be omitted. In other words, the rotation angle may be 0. The magnitude or the existence of the rotation angle may be designed according to an requirement of optical engine in practice, and the invention places no limitation thereon.

It can be known by performing optical simulations that the lens array module 200 of the embodiment may transmit 70.6% of the energy of the light source 110 to the light valve 120, whereas a conventional lens array merely transmits 58.6% of the energy of the light source to the light valve. Accordingly, the lens array module 200 of the embodiment can increase the light utilization efficiency by approximately 20% compared to the conventional lens array.

Figure 4:
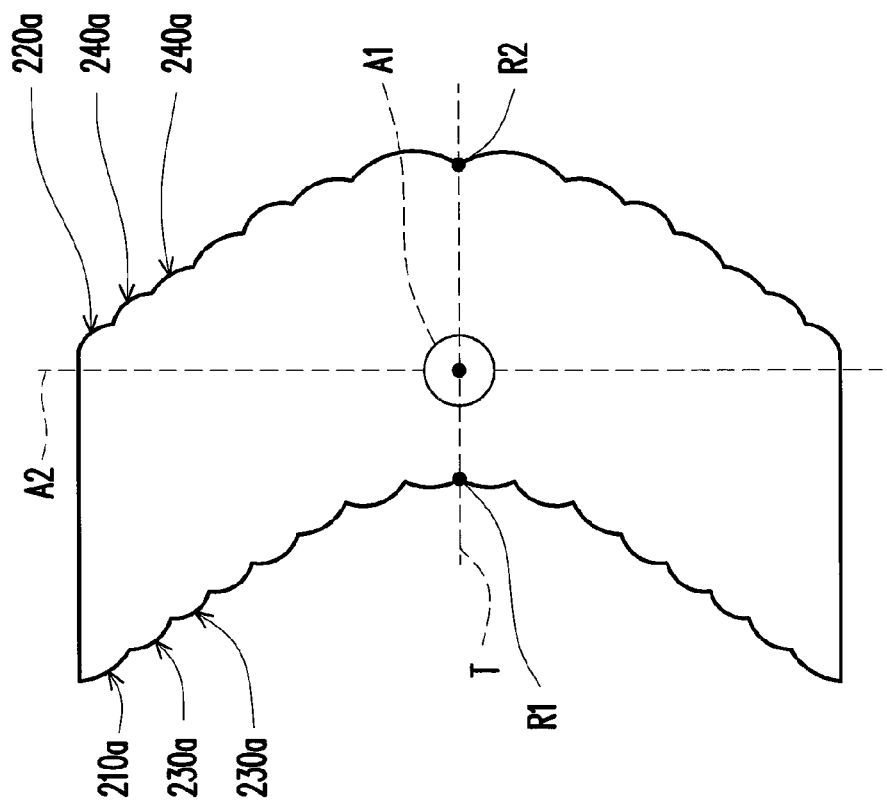
FIG. 4 is a schematic cross-sectional view of a lens array module of a projection apparatus according to another embodiment of the invention.

FIG. 4 is a schematic cross-sectional view of a lens array module of a projection apparatus according to another embodiment of the invention. Referring to FIG. 4, a lens array module 200a of the embodiment is similar to the lens array module 200 depicted in FIGS. 1 and 3A-3B. The dissimilarities are described below. In the lens array module 200 depicted in FIGS. 1 and 3A-3B, the center of curvature O1 of each of the first lens surfaces 230 only deviates in a direction parallel to the first reference axis A1, and the center of curvature O2 of each of the second lens surfaces 240 only deviates in a direction parallel to the first reference axis A1. However, in the lens array module 200a of the embodiment, the center of curvature of each of the first lens surfaces 230a on the light incident surface 210a deviates in a direction parallel to the first reference axis A1 and in a direction parallel to the second reference axis A2. The center of curvature of each of the second lens surfaces 240a on the light emitting surface 220a deviates in a direction parallel to the first reference axis A1 and in a direction parallel to the second reference axis A2. For the lens array module 200a of the embodiment, a cross-sectional view thereof parallel to the y-z plane can be referenced to the illustration of FIG. 1. In addition, a cross-sectional view thereof parallel to the x-z plane can be referenced to the illustration of FIG. 4.

More specifically, the center of curvature of each of the first lens surfaces 230a located at two other sides (e.g., two opposite sides of the first reference axis A1) of the first reference point R1 on the light incident surface 210a deviates away from the first reference point R1 in a direction parallel to the first reference axis A2. Moreover, the center of curvature of each of the second lens surfaces 240a located at two other sides (e.g., two opposite sides of the first reference axis A1) of the second reference point R2 on the light emitting surface 220a deviates toward the second reference point R2 in a direction parallel to the second reference axis A2. The first reference axis A1 is not parallel to the second reference axis A2. In the embodiment, the first reference axis A1 is substantially perpendicular to the second reference axis A2.

The lens array module 200a of the embodiment may further decrease stray light on the x-direction, thereby enhancing the brightness of the image provided by the projection apparatus.

Figure 5:
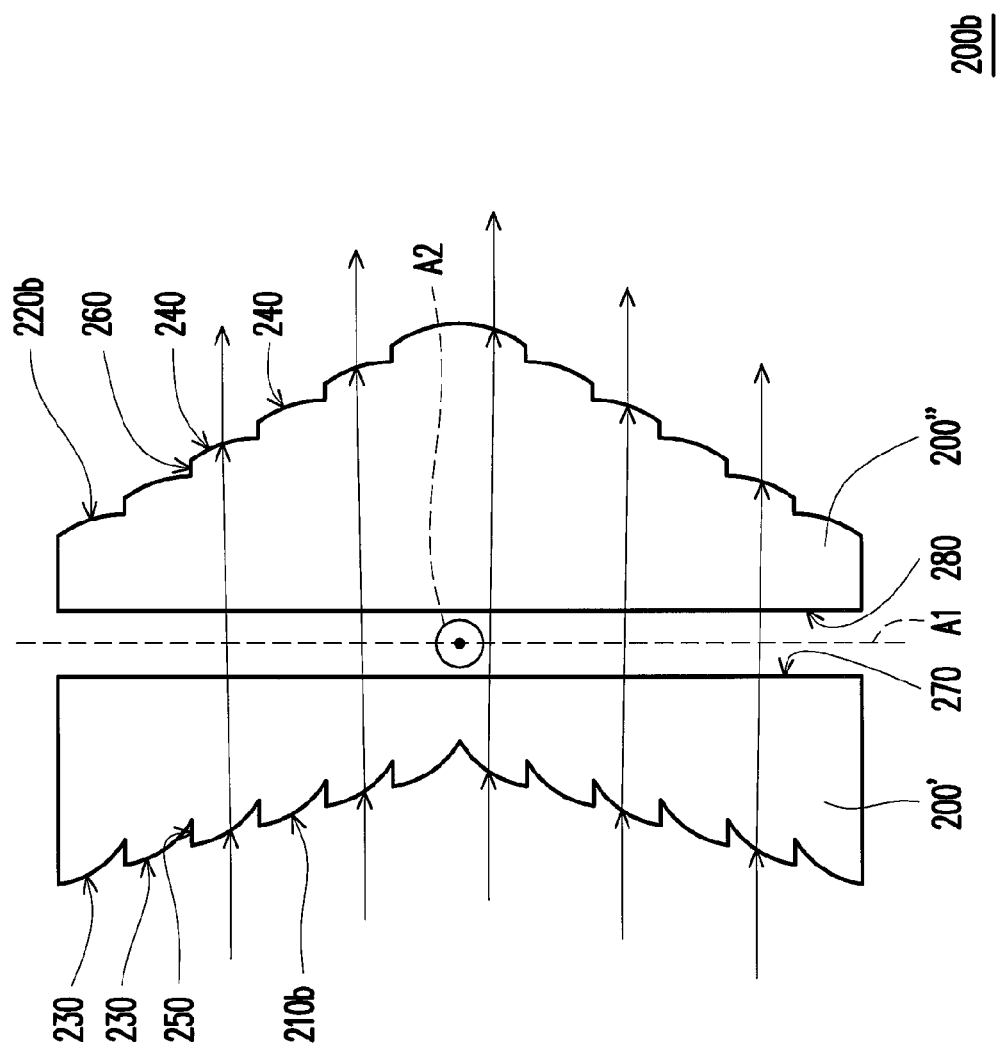
FIG. 5 is a schematic cross-sectional view of a lens array module of a projection apparatus according to another embodiment of the invention.

FIG. 5 is a schematic cross-sectional view of a lens array module of a projection apparatus according to another embodiment of the invention. Referring to FIG. 5, a lens array module 200b of the embodiment is similar to the lens array module 200 depicted in FIG. 1. The dissimilarities are described below. In the embodiment of the invention, a segmented step 250 is disposed between two neighboring first lens surfaces 230 of a light incident surface 210b of the lens array module 200b (e.g., two neighboring first lens surfaces 230 in a direction parallel to the first reference axis A1). Moreover, a segmented step 260 is disposed between two neighboring second lens surfaces 240 of a light emitting surface 220b of the lens array module 200b (e.g., two neighboring second lens surfaces 240 in a direction parallel to the first reference axis A1). As long as the size of the segmented steps 250 and 260 is not overly large, the lens array module 200b can still maintain preferable light utilization efficiency.

In the embodiment of the invention, the lens array module 200b is formed by two transparent substrates 200' and 200". However, in other embodiments, the lens array module 200b may also be formed by a single transparent substrate similar to the lens array module 200 depicted in FIG. 1. In other words, the transparent substrates 200' and 200" are integrally formed. Moreover, the lens array module 200 of FIG. 1 may also be formed by two transparent substrates similar to the lens array module 200b. In the embodiment, a light emitting surface 270 of the transparent substrate 200' and a light incident surface 280 of the transparent substrate 200" are planar surfaces, although the invention is not limited thereto. A material of the transparent substrates forming the lens array modules 200 and 200b includes, for example, plastic or glass, although the invention is not limited thereto.

Figure 6:
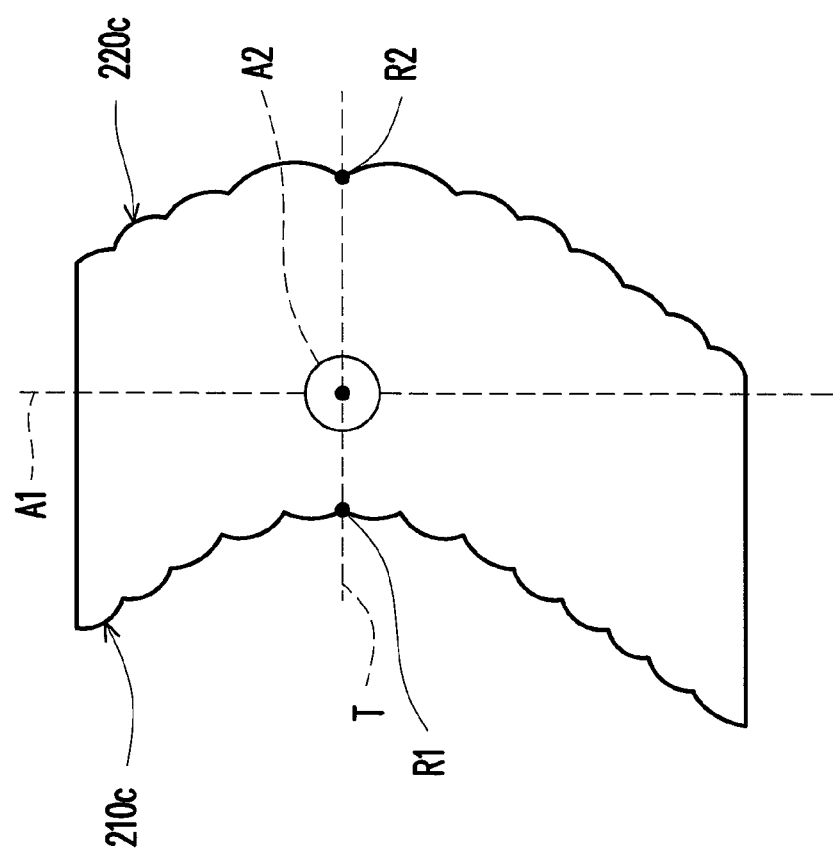
FIG. 6 is a schematic cross-sectional view of a lens array module of a projection apparatus according to another embodiment of the invention.
Figure 6:
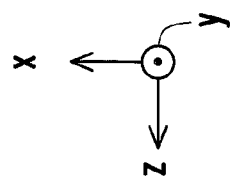

FIG. 6 is a schematic cross-sectional view of a lens array module of a projection apparatus according to another embodiment of the invention. A lens array module 200c of the embodiment is similar to the lens array module 200 depicted in FIG. 1. A difference therebetween is that, in the lens array module 200c of the embodiment, the first reference point R1 deviates from the center of a light incident surface 210c, and the second reference point R2 deviates from the center of a light emitting surface 220c. Accordingly, the optical axis of the illumination beam can be designed to be deviated from the center of the lens array module 200c.

In view of the foregoing, the embodiments of the invention include at least one of the following advantages or effects. In the lens array module and the projection apparatus according to the embodiments of the invention, since the center of curvature of each of the first lens surfaces located at two opposite sides of the first reference point on the light incident surface deviates away from the first reference point in a direction parallel to the first reference axis, and the center of curvature of each of the second lens surfaces located at two opposite sides of the second reference point on the light emitting surface deviates toward the second reference point in a direction parallel to the first reference axis, therefore, when the light from the first lens surfaces is projected on the light emitting surface, the projection range exceeding the area of the corresponding second lens surfaces is effectively reduced. Accordingly, the crosstalk phenomenon is effectively reduced so as to enhance the light utilization efficiency, and thereby the brightness of the images provided by the projection apparatus is increased.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens array module, comprising:
   a light incident surface;
   a light emitting surface opposite to the light incident surface;
   a plurality of first lens surfaces arranged on the light incident surface to form into an array; and
   a plurality of second lens surfaces arranged on the light emitting surface to form into an array, wherein a center of curvature of each of the first lens surfaces located at two opposite sides of a first reference point on the light incident surface deviates away from the first reference point in a direction parallel to a first reference axis, and a center of curvature of each of the second lens surfaces located at two opposite sides of a second reference point on the light emitting surface deviates toward the second reference point in a direction parallel to the first reference axis,
   wherein an area of each of the second lens surfaces adjacent to the second reference point in a direction parallel to the first reference axis is greater than an area of each of the second lens surfaces away from the second reference point in the direction parallel to the first reference axis.

2. The lens array module as claimed in claim 1, wherein the first reference point is disposed at a center of the light incident surface, and the second reference point is disposed at a center of the light emitting surface.

3. The lens array module as claimed in claim 1, wherein the first reference axis is substantially perpendicular to an optical axis of the lens array module.

4. The lens array module as claimed in claim 1, wherein the center of curvature of each of the first lens surfaces located at another two sides of the first reference point on the light incident surface deviates away from the first reference point in a direction parallel to a second reference axis, and the center of curvature of each of the second lens surfaces located at another two sides of the second reference point on the light emitting surface deviates toward the second reference point in a direction parallel to the second reference axis, wherein the first reference axis is not parallel to the second reference axis.

5. The lens array module as claimed in claim 4, wherein the first reference axis and the second reference axis are substantially perpendicular to the optical axis of the lens array module, and the first reference axis is substantially perpendicular to the second reference axis.

6. The lens array module as claimed in claim 1, wherein no segmented step exists between two neighboring first lens surfaces, and no segmented step exists between two neighboring second lens surfaces.

7. The lens array module as claimed in claim 1, wherein the first reference point deviates from the center of the light incident surface, and the second reference point deviates from the center of the light emitting surface.

8. A projection apparatus, comprising:
a light source capable of emitting an illumination beam;
a lens array module disposed on a transmission path of the illumination beam, comprising:
   a light incident surface;
   a light emitting surface opposite to the light incident surface, wherein the illumination beam passes through the light incident surface and the light emitting surface in sequence;
   a plurality of first lens surfaces arranged on the light incident surface to form into an array; and
   a plurality of second lens surfaces arranged on the light emitting surface to form into an array, wherein a center of curvature of each of the first lens surfaces located at two opposite sides of a first reference point on the light incident surface deviates away from the first reference point in a direction parallel to a first reference axis, and a center of curvature of each of the second lens surfaces located at two opposite sides of a second reference point on the light emitting surface deviates toward the second reference point in a direction parallel to the first reference axis; and
a light valve disposed on the transmission path of the illumination beam from the lens array module, wherein the light valve is capable of converting the illumination beam into an image beam,
wherein an area of the second lens surfaces adjacent to the second reference point in a direction parallel to the first reference axis is greater than an area of the second lens surfaces away from the second reference point in the direction parallel to the first reference axis.

9. The projection apparatus as claimed in claim 8, wherein the first reference point is disposed at a center of the light incident surface, and the second reference point is disposed at a center of the light emitting surface.

10. The projection apparatus as claimed in claim 8, wherein the first reference axis is substantially perpendicular to an optical axis of the lens array module.

11. The projection apparatus as claimed in claim 8, wherein the center of curvature of each of the first lens surfaces located at another two sides of the first reference point on the light incident surface deviates away from the first reference point in a direction parallel to a second reference axis, and the center of curvature of each of the second lens surfaces located at another two sides of the second reference point on the light emitting surface deviates toward the second reference point in a direction parallel to the second reference axis, wherein the first, reference axis is not parallel to the second reference axis.

12. The projection apparatus as claimed in claim 11, wherein the first reference axis and the second reference axis are substantially perpendicular to the optical axis of the lens array module, and the first reference axis is substantially perpendicular to the second reference axis.

13. The projection apparatus as claimed in claim 8, wherein no segmented step exists between two neighboring first lens surfaces, and no segmented step exists between two neighboring second lens surfaces.

14. The projection apparatus as claimed in claim 8, wherein the first reference point deviates from the center of the light incident surface, and the second reference point deviates from the center of the light emitting surface.

15. The projection apparatus as claimed in claim 8, wherein the first lens surfaces respectively corresponds to the second lens surfaces, and the illumination beam passing through the first lens surfaces respectively passes through the corresponding second lens surfaces.

16. The projection apparatus as claimed in claim 15, wherein areas of at least a part of the second lens surfaces respectively cover the illumination beam from the corresponding first lens surfaces.

17. The projection apparatus as claimed in claim 8, wherein the light source comprises at least a light-emitting diode.

* * * * *